United States Patent
Yoshioka et al.

(10) Patent No.: US 12,508,571 B2
(45) Date of Patent: Dec. 30, 2025

(54) METHOD FOR REGENERATING LIQUID TO BE TREATED, AND REGENERATING AGENT FOR LIQUID TO BE TREATED

(71) Applicants: NIKKISO CO., LTD., Tokyo (JP); TOHOKU UNIVERSITY, Miyagi (JP)

(72) Inventors: Toshiaki Yoshioka, Miyagi (JP); Tomohito Kameda, Miyagi (JP); Fumihiko Kitagawa, Ishikawa (JP); Yoichi Jimbo, Ishikawa (JP); Masayuki Kondo, Ishikawa (JP)

(73) Assignees: NIKKISO CO., LTD., Tokyo (JP); TOHOKU UNIVERSITY, Miyagi (JP)

( * ) Notice: Subject to any disclaimer, the term of this patent is extended or adjusted under 35 U.S.C. 154(b) by 389 days.

(21) Appl. No.: 18/174,820

(22) Filed: Feb. 27, 2023

(65) Prior Publication Data

US 2023/0211313 A1   Jul. 6, 2023

Related U.S. Application Data

(63) Continuation of application No. PCT/JP2021/031932, filed on Aug. 31, 2021.

(30) Foreign Application Priority Data

Sep. 3, 2020   (JP) .................. 2020-148284

(51) Int. Cl.
  *B01J 20/08* (2006.01)
  *B01J 20/18* (2006.01)
(52) U.S. Cl.
  CPC .............. *B01J 20/08* (2013.01); *B01J 20/18* (2013.01)

(58) Field of Classification Search
  CPC ................... B01J 20/08; B01J 20/18
  See application file for complete search history.

(56) References Cited

FOREIGN PATENT DOCUMENTS

| JP | H01-281072 | A | 11/1989 | |
|----|---|---|---|---|
| JP | 2020019799 | A | 2/2020 | |
| WO | WO2015122528 | A1 | 8/2015 | |
| WO | WO2020040041 | A1 | 2/2020 | |
| WO | WO-2020050068 | A1 * | 3/2020 | ........... B01D 15/363 |
| WO | WO2020050069 | A1 | 3/2020 | |

OTHER PUBLICATIONS

Kitagawa (Proceedings of the 71st Meeting of the Society for Biotechnology, 2019, Japan) (Year: 2019).*
WO 2020/050068 A1_English translation (Year: 2020).*
Kitagawa et al., Attempt at Culture Regeneration Method Using Sorbents. Proceedings of the 71st meeting of the Society for Biotechnology, Japan, 2019, p. 290. 3Hpo5.
An extended Search Report for EP Application No. EP21864329, dated Oct. 28, 2024 is attached (6 pages).

* cited by examiner

*Primary Examiner* — Youngsul Jeong
(74) *Attorney, Agent, or Firm* — MUNCY, GEISSLER, OLDS & LOWE, P.C.

(57) ABSTRACT

Provided is a method for regenerating a liquid to be treated, the method includes bringing a lactic acid adsorbent that contains a Mg—Al-based layered double hydroxide having $Mg^{2+}$ and $Al^{3+}$ as constituent metals, and an ammonia adsorbent having L-type zeolite, into contact with the liquid to be treated that contains lactic acid and ammonia, to remove lactic acid and ammonia in the liquid to be treated.

2 Claims, 4 Drawing Sheets

FIG. 2

| ADSORPTION PROCESS | SIMULTANEOUS TREATMENT | TWO-STEP TREATMENT LACTIC ACID→AMMONIA | TWO-STEP TREATMENT AMMONIA→LACTIC ACID |
|---|---|---|---|
| LACTIC ACID ADSORPTION RATE (%) | 53.9 | 53.7 | 55.1 |
| AMMONIA ADSORPTION RATE (%) | 64.3 | 70.1 | 79.0 |

FIG. 3

| ADSORBENT CONCENTRATION (g/mL) | ADSORPTION PROCESS | SIMULTANEOUS TREATMENT | TWO-STEP TREATMENT LACTIC ACID→AMMONIA | TWO-STEP TREATMENT AMMONIA→LACTIC ACID |
|---|---|---|---|---|
| 0.001 | LACTIC ACID ADSORPTION RATE (%) | 1.4 | 1.2 | 1.9 |
| | AMMONIA ADSORPTION RATE (%) | 7.2 | 6.4 | 6.9 |
| | GLUCOSE ADSORPTION RATE (%) | 1.2 | 0.9 | 1.1 |
| | pH | 7.6 | 7.7 | 7.6 |
| 0.005 | LACTIC ACID ADSORPTION RATE (%) | 11.1 | 10.2 | 12.3 |
| | AMMONIA ADSORPTION RATE (%) | 19.8 | 18.3 | 20.4 |
| | GLUCOSE ADSORPTION RATE (%) | 3.4 | 3.4 | 2.9 |
| | pH | 7.8 | 7.8 | 7.9 |
| 0.025 | LACTIC ACID ADSORPTION RATE (%) | 31.4 | 32.4 | 29.4 |
| | AMMONIA ADSORPTION RATE (%) | 51.4 | 46.4 | 58.6 |
| | GLUCOSE ADSORPTION RATE (%) | 8.8 | 10.4 | 10.1 |
| | pH | 8.0 | 8.0 | 8.2 |
| 0.05 | LACTIC ACID ADSORPTION RATE (%) | 43.1 | 40.2 | 44.1 |
| | AMMONIA ADSORPTION RATE (%) | 67.1 | 62 | 73.4 |
| | GLUCOSE ADSORPTION RATE (%) | 13.6 | 16.2 | 16.1 |
| | pH | 8.3 | 8.5 | 8.2 |
| 0.1 | LACTIC ACID ADSORPTION RATE (%) | 53.9 | 52.9 | 52.9 |
| | AMMONIA ADSORPTION RATE (%) | 70.9 | 84.6 | 86.7 |
| | GLUCOSE ADSORPTION RATE (%) | 18.8 | 19.9 | 19.4 |
| | pH | 8.5 | 8.4 | 8.5 |

FIG. 4A

| SIMULTANEOUS TREATMENT | | LACTIC ACID ADSORBENT | | | | |
|---|---|---|---|---|---|---|
| | | Ca-Al LDH | Cu-Al LDH | Mg-Al LDH | Mg-Al LDO | WEAKLY BASIC ANION EXCHANGE RESIN |
| AMMONIA ADSORBENT | STRONGLY ACIDIC CATION EXCHANGE RESIN | X | A | Ba | Ba | Ba |
| | L-TYPE ZEOLITE | Ba | X | A | Ba | Bl |
| | METAL COMPLEX | X | A | Ba | Ba | Bl |

FIG. 4B

| TWO-STEP TREATMENT LACTIC ACID→AMMONIA | | LACTIC ACID ADSORBENT | | | | |
|---|---|---|---|---|---|---|
| | | Ca-Al LDH | Cu-Al LDH | Mg-Al LDH | Mg-Al LDO | WEAKLY BASIC ANION EXCHANGE RESIN |
| AMMONIA ADSORBENT | STRONGLY ACIDIC CATION EXCHANGE RESIN | X | A | A | A | Bl |
| | L-TYPE ZEOLITE | Ba | Bl | A | Bl | Bl |
| | METAL COMPLEX | X | A | Bl | Bl | Bl |

FIG. 4C

| TWO-STEP TREATMENT AMMONIA→LACTIC ACID | | LACTIC ACID ADSORBENT | | | | |
|---|---|---|---|---|---|---|
| | | Ca-Al LDH | Cu-Al LDH | Mg-Al LDH | Mg-Al LDO | WEAKLY BASIC ANION EXCHANGE RESIN |
| AMMONIA ADSORBENT | STRONGLY ACIDIC CATION EXCHANGE RESIN | Ba | Ba | Ba | Ba | Ba |
| | L-TYPE ZEOLITE | Ba | Ba | A | A | A |
| | METAL COMPLEX | Ba | Ba | A | Ba | Ba |

METHOD FOR REGENERATING LIQUID TO BE TREATED, AND REGENERATING AGENT FOR LIQUID TO BE TREATED

CROSS-REFERENCE TO RELATED APPLICATIONS

This application is based upon and claims the benefit of priority from the prior Japanese Patent Application No. 2020-148284, filed on Sep. 3, 2020, and International Patent Application No. PCT/JP2021/031932, filed on Aug. 31, 2021, the entire content of each of which is incorporated herein by reference.

BACKGROUND

Field of the Invention

The present invention relates to a method for regenerating a liquid to be treated, and a regenerating agent for a liquid to be treated.

Description of the Related Art

Artificial and efficient mass culture of cell or microorganism has been required typically in the fields of pharmaceutical production and regenerative medicine. Cell for which mass-culture is required includes antibody-producing cell and pluripotent stem cell. These cells and so forth, if mass-culturable stably over a long period, enable efficient production of biological substances such as monoclonal antibody, or differentiation-inducing tissue derived from the pluripotent stem cell.

A possible method for industrial mass-culture of the cells and so forth may be suspension stirred culture with use of a culture tank. On the other hand, industrial use of the cells tends to push up the culture cost, due to increased scale of culture. It is therefore effective to increase culture density of the cells and so forth, for cost reduction. Increase of the culture density, however, has been known to suppress proliferation of the cells and so forth. This is because the thus densified cell and so forth elevates the concentration of wastes (metabolites) in the culture liquid (liquid medium), and this reduces proliferative activity of the cell and so forth. Lactic acid and ammonia have been known as representative wastes that can affect the cell and so forth.

It is therefore preferred to remove lactic acid and ammonia accumulated in the culture liquid, in order to stably multiply the cell and so forth in a dense state. On the other hand, Patent Literature 1 for example discloses a cell culture apparatus, in which a cell culture tank and a component adjusting solution tank are connected by a liquid feeding line provided with a culture solution component adjustment membrane through which components can permeate depending on concentration difference. In this cell culture device, the wastes accumulated in the culture solution move to the component adjusting solution side, so that the concentration in the culture solution decreases. Note that the component adjusting solution having been used is the culture liquid per se.

Patent Literature 1: WO2015/122528

The cell culture apparatus disclosed in Patent Literature 1 has removed wastes from the culture liquid, on the principle of dialysis. A tank of the component adjusting solution has therefore been designed to have a capacity 10 times or more larger than the cell culture tank, in order to fully remove the wastes. This has posed a problem that a huge volume of liquid is necessary, and the cost grows high. In particular, use of the culture liquid per se consequently consumes a large volume of expensive medium, further pushing up the cost. In addition, removal of the wastes based on the dialysis technique has also posed a problem of complicating the structure of the culture apparatus.

Lactic acid and ammonia are desired to be removed not only in culture liquid of cell and so forth, but also in other liquid systems. A novel technique for removing lactic acid and ammonia, with use of a technique other than dialysis, has therefore been strongly desired.

SUMMARY OF THE INVENTION

The present invention has been arrived at in view of such circumstances, wherein an object of which is to provide a novel technique for removing lactic acid and ammonia.

A mode of the present invention relates to a method for regenerating a liquid to be treated. The method includes bringing a lactic acid adsorbent that contains a Mg—Al-based layered double hydroxide having $Mg^{2+}$ and $Al^{3+}$ as constituent metals, and an ammonia adsorbent having L-type zeolite, into contact with the liquid to be treated that contains lactic acid and ammonia, to remove lactic acid and ammonia in the liquid to be treated.

Another mode of the present invention relates to a regenerating agent for a liquid to be treated. The regenerating agent for a liquid to be treated contains a lactic acid adsorbent that contains a Mg—Al-based layered double hydroxide having $Mg^{2+}$ and $Al^{3+}$ as constituent metals; and an ammonia adsorbent having L-type zeolite, the agent being structured to remove lactic acid and ammonia in the liquid to be treated, upon being bought into contact with the liquid to be treated that contains lactic acid and ammonia.

Note that also free combinations of these constituents, and also any of the constituents and expressions exchanged among the method, device and system, are valid as the modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a chart summarizing adsorption rate of lactic acid, and adsorption rate of ammonia, in an aqueous solution of lactic acid and ammonia.

FIG. 3 is a chart summarizing adsorption rate of lactic acid, adsorption rate of ammonia, adsorption rate of glucose, and pH, in a cell culture liquid.

FIG. 4A is a chart summarizing adsorptivity in a simultaneous treatment system under various combinations of adsorbents. FIG. 4B is a chart summarizing adsorptivity in a two-step treatment system in which lactic acid adsorption treatment is followed by ammonia adsorption treatment, under various combinations of adsorbents. FIG. 4C is a chart summarizing adsorptivity in a two-step treatment system in which ammonia adsorption treatment is followed by lactic acid adsorption treatment, under various combinations of adsorbents.

DETAILED DESCRIPTION OF THE INVENTION

Figure 1A:
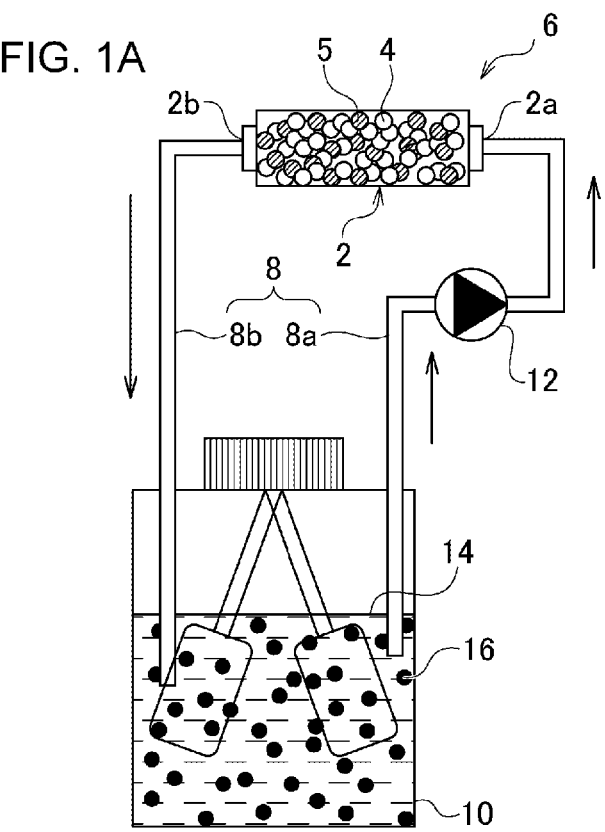
FIG. 1A to FIG. 1D are schematic drawings for explaining a method for regenerating a liquid to be treated according to an embodiment.

A mode of the present invention relates to a method for regenerating a liquid to be treated. The method includes bringing a lactic acid adsorbent that contains a Mg—Al-based layered double hydroxide having $Mg^{2+}$ and $Al^{3+}$ as constituent metals, and an ammonia adsorbent having L-type zeolite, into contact with the liquid to be treated that contains lactic acid and ammonia, to remove lactic acid and ammonia in the liquid to be treated. According to this mode, a novel method for removing lactic acid ammonia may be provided.

In this mode, the liquid to be treated may contain glucose. In any one of these modes, the liquid to be treated may be a culture liquid of at least either cell or microorganism. In any one of these modes, an amount of consumption of each of the lactic acid adsorbent and the ammonia adsorbent may be adjusted so that the concentration thereof relative to the liquid to be treated will be 0.025 g/mL or higher and 0.1 g/mL or lower.

Another mode of the present invention relates to a regenerating agent for a liquid to be treated. The regenerating agent for a liquid to be treated contains a lactic acid adsorbent that contains a Mg—Al-based layered double hydroxide having $Mg^{2+}$ and $Al^{3+}$ as constituent metals; and an ammonia adsorbent having L-type zeolite, the agent being structured to remove lactic acid and ammonia in the liquid to be treated, upon being bought into contact with the liquid to be treated that contains lactic acid and ammonia.

The present invention will be explained below on the basis of preferred embodiments, referring to the attached drawings. The embodiments are merely illustrative, and are not restrictive about the invention. All features and combinations thereof described in the embodiments are not always necessarily essential to the present invention. All identical or equivalent constituents, members and treatments illustrated in the individual drawings will be given same reference numerals, so as to properly avoid redundant explanations.

Reduced scales and shapes of the individual parts in the individual drawings are properly given for simplicity of explanation, and should not be interpreted restrictively unless otherwise specifically noted. Also note that ordinal terms "first", "second" and so on used in this patent specification and in claims do not represent any sequential order or importance, and are used only for discrimination of one structure from the other. Also note that some of the members that are not important for explaining the embodiment will be omitted from the individual drawings.

The present inventors have made extensive studies on the technique for removing lactic acid and ammonia, and have found a combination of a lactic acid adsorbent and an ammonia adsorbent capable of highly selectively adsorbing lactic acid and ammonia. More specifically, the regenerating agent for a liquid to be treated according to the present embodiment includes a lactic acid adsorbent that contains a layered double hydroxide (LDH), and an ammonia adsorbent having L-type zeolite.

LDH contained in the lactic acid adsorbent is an Mg—Al-based LDH having $Mg^{2+}$ and $Al^{3+}$ as constituent metals. LDH has a plurality of host layers (metal hydroxide layers), and an anion and water molecule intercalated between the host layers, and the host layers contain divalent metal ion $Mg^{2+}$ and trivalent metal ion $Al^{3+}$ as the constituent metals. More specifically, the LDH is composed of octahedron-arrayed host layers which are positively charged due to substitution of a part of $Mg^{2+}$ in $Mg(OH)_2$ with $Al^{3+}$, and a guest layer that contains an anion that compensates the positive charge of the host layers, and intercalated water. Lactic acid (lactate ion) is adsorbed to LDH, as a result of ion exchange with the anion in the guest layer. LDH having $Mg^{2+}$ and $Al^{3+}$ is represented by a chemical formula below.

$$[Mg^{2+}_{1-x}Al^{3+}_{x}(OH)_2][A^{n-}_{x/n} \cdot yH_2O]$$

In the formula, $A^{n-}$ represents an n-valent anion selected from the group consisting of HEPES, citric acid, pyruvic acid, $CO_3^{2-}$, $SO_4^{2-}$, $Cl^-$, $OH^-$, $SiO_4^{4-}$, $SO_4^{2-}$ and $NO_3^-$. Represents 0.22 to 0.33, n represents 1 to 3, and y represents 1 to 12.

With the Mg—Al-based LDH contained therein, the lactic acid adsorbent can demonstrate good adsorptivity to lactic acid, when combined with the ammonia adsorbent that contains L-type zeolite. Also toxicity of LDH to cell and so forth may be more likely to be reduced, as compared with a case where LDH contains Cu. A plurality of types of LDH, having different types of metal ion and anion that constitute LDH, may be used in a mixed manner.

L-type zeolite contained in the ammonia adsorbent has a basic skeleton composed of silicon oxide, with a part of silicon in the basic skeleton substituted with aluminum. The crystal as a whole is therefore negatively charged. Zeolite retains cations in the zeolite pores, in order to maintain electrical neutrality. The cations are reversibly interchangeable. Ammonia (ammonium ions) is adsorbed by the L-type zeolite, as a result of ion exchange with the retained ion. With the L-type zeolite contained therein, the ammonia adsorbent can demonstrate good adsorptivity to ammonia, when combined with the aforementioned lactic acid adsorbent.

The L-type zeolite usable herein includes synthetic zeolite such as 500KOA (from Tosoh Corporation), and HS-500 (from FUJIFILM Wako Pure Chemical Corporation). These L-type zeolites retain K as the retained cation. The retained ion, although preferably K, may alternatively be alkali metal, alkaline earth metal or lanthanoid, such as Na, Li, Rb, Ce, Ba, Ca, Mg, Sr, and La; and, Al or Fe. The retained ion may alternatively be H. Alternatively, a plurality of types of L-type zeolites having different retained ions may be used in a mixed manner.

The aforementioned lactic acid adsorbent can adsorb lactic acid, simply upon contact with lactic acid. Meanwhile, the aforementioned ammonia adsorbent can adsorb ammonia, simply upon contact with ammonia. Hence, the regenerating agent of this embodiment may be suitably used for adsorptive removal of lactic acid and ammonia in the liquid. In this case, lactic acid and ammonia in the liquid to be treated may be removed by bringing the lactic acid adsorbent and the ammonia adsorbent into contact with the liquid to be treated that contains lactic acid and ammonia.

For the liquid to be treated containing glucose as a useful component, the regenerating agent can adsorb lactic acid and ammonia to be removed, with selectivity higher than that for glucose to be remained in the liquid. The liquid to be treated containing glucose is exemplified by a culture liquid of at least either cell or microorganism. That is, the regenerating agent of this embodiment is suitably applicable to regeneration treatment of culture liquid. The type of the culture liquid is not particularly limited. The regenerating agent may also be used in combination with an adsorbent that adsorbs any other cell waste product.

The amount of consumption of each of the lactic acid adsorbent and the ammonia adsorbent, in the regenerating treatment of the liquid to be treated, that is, the amount of each adsorbent to be contained in the regenerating agent, is preferably adjusted so that the concentration thereof relative to the liquid to be treated will be 0.025 g/mL or higher and 0.1 g/mL or lower. With the amount of consumption (concentration) of each of the lactic acid adsorbent and the ammonia adsorbent adjusted to 0.025 g/mL or more, it becomes possible to more effectively adsorb lactic acid and ammonia. Meanwhile, with the amount of consumption (concentration) of each of the lactic acid adsorbent and the ammonia adsorbent adjusted to 0.1 g/mL or lower, it becomes possible to effectively suppress the glucose adsorptivity. Also the pH may be more effectively suppressed from fluctuating. This enables more efficient culture of cell and so forth.

The cell and microorganism cultured with use of the culture liquid are not particularly limited. The cell is exemplified by pluripotent stem cell and differentiation-induced cell such as human iPS cell, human ES cell, and human Muse cell; somatic stem cell such as mesenchymal stem cell (MSC) and nephron precursor cell; tissue cell such as human renal proximal tubule epithelial cell, human distal tubule epithelial cell, and human collecting duct epithelial cell; antibody-producing cell line such as human fetal renal cell (HEK293 cell); and antibody-producing cell line derived from animals other than human such as Chinese hamster ovary cell (CHO cell) and insect cell (SF9 cell).

Method for Regenerating Liquid to be Treated

The method for regenerating the liquid to be treated according to this embodiment includes adsorptively removing lactic acid and ammonia in the liquid to be treated, by bringing the aforementioned lactic acid adsorbent and the ammonia adsorbent into contact with the liquid to be treated that contains lactic acid and ammonia. The method of bringing the individual adsorbents into contact with the liquid to be treated are exemplified as follows, although not particularly limited thereto. FIG. 1A to FIG. 1D are schematic drawings for explaining methods for regenerating the liquid to be treated according to the embodiment. Although the description below will deal with removal of lactic acid and ammonia from the culture liquid, also removal of lactic acid and ammonia from any other liquid to be treated may be conducted in the same way.

In a first mode illustrated in FIG. 1A, an adsorption module 6, having a vessel 2 such as a column in which a lactic acid adsorbent 4 and an ammonia adsorbent 5 are packed, is prepared. The vessel 2 has an inlet 2a and an outlet 2b through which the inside and the outside of the vessel 2 are communicated. The lactic acid adsorbent 4 and the ammonia adsorbent 5 are typically in the form of particle, which are mixed and housed in the adsorption module 6. The adsorption module 6 is connected through a circulation path 8, to a culture container 10 such as a spinner flask. The circulation path 8 has an outward path 8a that connects the culture container 10 and the inlet 2a of the vessel 2, and a return path 8b that connects the outlet 2b of the vessel 2 and the culture container 10. The outward path 8a has a pump 12 connected in the middle thereof. The culture container 10 houses a culture liquid 14 and a cell 16. The pump 12 may alternatively be arranged on the return path 8b.

Upon operation of the pump 12, the culture liquid 14 is sucked from the culture container 10, and fed through the outward path 8a to the vessel 2 of the adsorption module 6. The culture liquid 14 fed to the vessel 2 is returned through the return path 8b, back to the culture container 10. The culture liquid 14, while being circulated between the culture container 10 and the adsorption module 6, comes into contact with the lactic acid adsorbent 4 and the ammonia adsorbent 5 packed in the vessel 2. In this process, lactic acid in the culture liquid 14 is adsorbed by the lactic acid adsorbent 4, and ammonia in the culture liquid 14 is adsorbed by the ammonia adsorbent 5. Lactic acid and ammonia in the culture liquid 14 are removed as a consequence.

The outward path 8a has an unillustrated filter arranged at the end thereof on the side connected to the culture container 10. This suppresses the cell 16 from migrating towards the adsorption module 6. Note that a medium component such as glucose or protein, necessary for culturing the cell 16, may be replenished into the culture liquid 14, in the process of circulating the culture liquid 14 between the culture container 10 and the adsorption module 6.

That is, in the first mode, lactic acid and ammonia in the culture liquid 14 are removed, with use of the regenerating apparatus that includes the adsorption module 6 having the lactic acid adsorbent 4 and the ammonia adsorbent 5 (that is, the regenerating agent); the culture container 10 that houses the cell 16 (or may be microorganism) and the culture liquid 14; and the circulation path 8 that connects the culture container 10 and the adsorption module 6, and allows the culture liquid 14 to circulate therethrough.

Figure 1B:
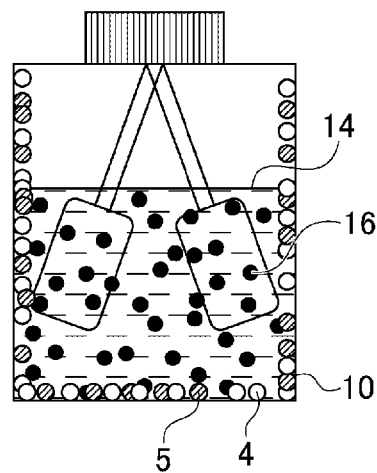

In a second mode illustrated in FIG. 1B, the lactic acid adsorbent 4 and the ammonia adsorbent 5 are supported on the inner wall face of the culture container 10. The culture container 10 houses the culture liquid 14 and the cell 16. The culture liquid 14 therefore comes into contact with the lactic acid adsorbent 4 and the ammonia adsorbent 5 that expose on the inner wall face of the culture container 10. Lactic acid and ammonia in the culture liquid 14 may thus be adsorbed to the lactic acid adsorbent 4 and to the ammonia adsorbent 5. The culture container 10 is exemplified by spinner flask, petri dish, well plate, cell culture insert, and microsphere.

Method for supporting the lactic acid adsorbent 4 and the ammonia adsorbent 5 on the inner wall face of the culture container 10 is exemplified by a method of adhering the lactic acid adsorbent 4 and the ammonia adsorbent 5 to the inner wall face of the culture container 10; and, a method of molding the culture container 10, if made of resin, with use of a resin having the lactic acid adsorbent 4 and the ammonia adsorbent 5 preliminarily kneaded therein. That is, lactic acid and ammonia in the culture liquid 14 in the second mode are removed with use of a regenerating apparatus having the culture container 10, and the lactic acid adsorbent 4 and the ammonia adsorbent 5 (that are regenerating agents) supported on the inner wall face of the culture container 10.

Figure 1C:
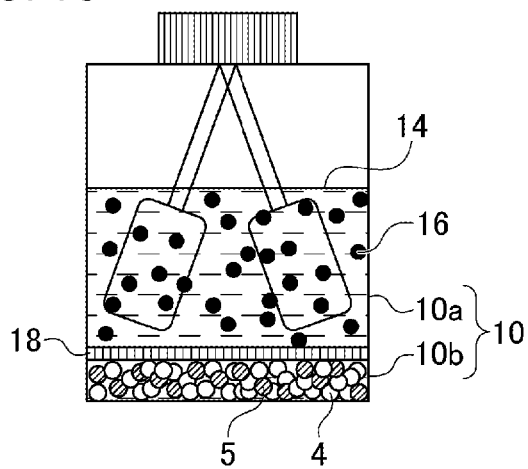

In a third mode illustrated in FIG. 1C, the culture container 10 is structured to have a diaphragm 18 such as a porous membrane, which divides the inside of the container into an upper part 10a and a lower part 10b. This sort of culture container 10 is exemplified by cell culture insert. The upper part 10a houses the culture liquid 14 and the cell 16, meanwhile the lower part 10b houses the culture liquid 14, the lactic acid adsorbent 4, and the ammonia adsorbent 5. The culture liquid 14 can move back and forth between the upper part 10a and the lower part 10b, through the diaphragm 18. In contrast, the cell 16, the lactic acid adsorbent 4, and the ammonia adsorbent 5 cannot pass through the diaphragm 18.

In this structure, the culture liquid 14 comes into contact with the lactic acid adsorbent 4 and the ammonia adsorbent 5 housed in the lower part 10b. Lactic acid and ammonia in the culture liquid 14 may thus be adsorbed to the lactic acid adsorbent 4 and to the ammonia adsorbent 5. That is, lactic acid and ammonia in the culture liquid 14 in the third mode are removed with use of the regenerating apparatus having the culture container 10, the lactic acid adsorbent 4 and the ammonia adsorbent 5 (that are regenerating agents), and the diaphragm 18 that divides the inside of the culture container 10 into a first space that houses the lactic acid adsorbent 4 and the ammonia adsorbent 5, and a second space that houses the cell 16 (or may be microorganism).

Figure 1D:
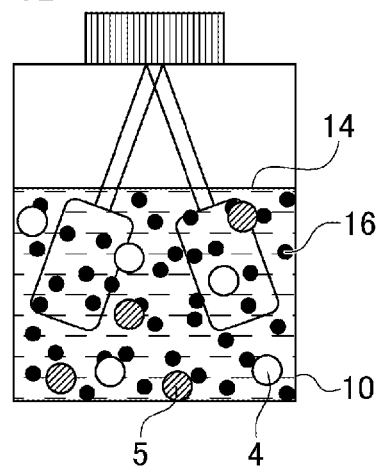

In a fourth mode illustrated in FIG. 1D, the lactic acid adsorbent 4 and the ammonia adsorbent 5 in the form of particle are allowed to disperse, precipitate or suspend in the culture liquid 14. Lactic acid and ammonia in the culture liquid 14 may thus be adsorbed to the lactic acid adsorbent 4 and to the ammonia adsorbent 5. The lactic acid adsorbent 4 and the ammonia adsorbent 5 added to the culture liquid 14 may be recovered by any of known methods such as filtration or centrifugation. The lactic acid adsorbent 4 and the ammonia adsorbent 5 preferably have a predetermined size or larger, which is typically 10 μm or larger, in order to avoid phagocytosis by the cell 16. That is, lactic acid and ammonia in the culture liquid 14 in the fourth mode are removed with use of a regenerating apparatus having the culture container 10, and the lactic acid adsorbent 4 and the ammonia adsorbent 5 (that are regenerating agents) added to the culture liquid 14 in the culture container 10.

The lactic acid adsorbent 4 and the ammonia adsorbent 5 are preferably coated with a resin such as polyvinyl alcohol, or a biological gel such as collagen, alginic acid, or gelatin. This suppresses outflow of any fine particle that may affect the cell 16, from the lactic acid adsorbent 4 and the ammonia adsorbent 5 into the culture liquid 14. The lactic acid adsorbent 4 is alternatively formed by kneading Mg—Al-based LDH typically with a ceramic binder, resin binder, or biological gel. Meanwhile, the ammonia adsorbent 5 is formed by kneading L-type zeolite typically with a ceramic binder, resin binder, or biological gel. This also successfully suppresses the outflow of fine particle. The ceramic binder is exemplified by alumina binder and colloidal silica. The resin binder is exemplified by polyvinyl alcohol and carboxymethyl cellulose. The biological gel is exemplified by collagen, alginic acid, and gelatin.

Note that, in the first to fourth modes, the lactic acid adsorbent 4 and the ammonia adsorbent 5 reside in a mixed manner in the adsorption module 6, on the inner wall face of the culture container 10, in the lower part 10b, or in the culture liquid 14. That is, the first to fourth modes represent simultaneous treatment systems designed to simultaneously bring the lactic acid adsorbent 4 and the ammonia adsorbent 5 into contact with the liquid to be treated. The timing at which the lactic acid adsorbent 4 and the ammonia adsorbent 5 are brought into contact with the liquid to be treated is, however, not limited thereto, instead the liquid to be treated may be contacted first with the lactic acid adsorbent 4 and then with the ammonia adsorbent 5, or, the liquid to be treated may be contacted first with the ammonia adsorbent 5 and then with the lactic acid adsorbent 4. That is, applicable is a two-step treatment system in which the liquid to be treated is contacted with the lactic acid adsorbent 4 and the ammonia adsorbent 5 at different timings.

In an exemplary two-step treatment system, the vessel 2 that houses the lactic acid adsorbent 4, and the vessel 2 that houses the ammonia adsorbent 5 are connected in series to the circulation path 8. Either of the two vessels 2 may be arranged upstream. Alternatively, the culture container 10 with the lactic acid adsorbent 4 supported on the inner wall face, and the culture container 10 with the ammonia adsorbent 5 supported on the inner wall face are prepared, and the culture liquid 14 filled in one culture contained 10 is transferred to the other culture container 10. Still alternatively, the culture container 10 with the lactic acid adsorbent 4 housed in the lower part 10b, and the culture container 10 with the ammonia adsorbent 5 housed in the lower part 10b are prepared, and the culture liquid 14 filled in one culture container 10 is transferred to the other culture container 10. Still alternatively, one of the lactic acid adsorbent 4 and the ammonia adsorbent 5 is added to the culture container 10, recovered after a lapse of a predetermined time, and subsequently the other adsorbent is added to the culture container 10.

In both of the simultaneous treatment system and the two-step treatment system, the duration over which the lactic acid adsorbent 4 and the ammonia adsorbent 5 are brought into contact with the culture liquid 14 may be appropriately determined, typically on the basis of empirical knowledge of the designer, or, experiment and simulation by the designer. Alternatively, for example, a concentration sensor may be connected typically to the circulation path 8 so as to measure the concentrations of lactic acid and ammonia in the culture liquid 14, according to which the adsorption treatment may be continued until the concentration of lactic acid and ammonia will become equal to or lower than predetermined values. As the concentration sensor, employable is any of known sensors such as a medium ingredient analyzer or the like. Possible methods for detecting the concentrations of lactic acid and ammonia include colorimetry with use of predetermined assay reagent, enzyme electrode method utilizing enzyme-substrate specificity, and high performance liquid chromatography (HPLC).

As explained previously, the method for regenerating a liquid to be treated according to this embodiment includes bringing the lactic acid adsorbent 4 that contains a Mg—Al-based LDH having $Mg^{2+}$ and $Al^{3+}$ as constituent metals, and the ammonia adsorbent 5 having L-type zeolite, into contact with the liquid to be treated that contains lactic acid and ammonia, to remove lactic acid and ammonia in the liquid to be treated. The regenerating agent for a liquid to be treated according to this embodiment contains the lactic acid adsorbent that contains a Mg—Al-based LDH, and the ammonia adsorbent having L-type zeolite, the agent being structured to remove lactic acid and ammonia in the liquid to be treated, upon being bought into contact with the liquid to be treated that contains lactic acid and ammonia.

This makes it possible to remove lactic acid and ammonia without using a huge volume of solution, unlike the prior case that relies upon a dialysis technique to remove lactic acid and ammonia. The present embodiment can therefore provide a novel removal technique capable of removing lactic acid and ammonia at low cost. Moreover, this embodiment can simplify the device structure necessary for the regeneration treatment of the liquid to be treated, since lactic acid and ammonia may be removed simply by contacting the lactic acid adsorbent 4 and the ammonia adsorbent 5 with the liquid to be treated that contains lactic acid and ammonia.

The present inventors also found from our extensive studies on the technique for removing lactic acid and ammonia that, depending on the types of the lactic acid adsorbent and the ammonia adsorbent, the simultaneous contact of these adsorbents with the liquid to be treated would occasionally results in an adsorption rate lower than in the case of sequential contact. The present inventors also found that the sequential contact of the lactic acid adsorbent and the ammonia adsorbent would occasionally result in a lowered adsorption rate, depending on the sequential order.

In contrast, with the combination of the lactic acid adsorbent and the ammonia adsorbent of this embodiment, excellent adsorption rate of lactic acid and adsorption rate of ammonia are obtainable, in any of the case relying upon simultaneous contact with the liquid to be treated; the case relying upon contact with the liquid to be treated first by the lactic acid adsorbent and then by the ammonia adsorbent; and the case relying upon contact with the liquid to be treated first by the ammonia adsorbent and then by the lactic acid adsorbent. Thus, the degree of freedom of the treatment process may be increased.

In a case where the liquid to be treated contains glucose, such combination of the lactic acid adsorbent and the ammonia adsorbent enables adsorption of lactic acid and ammonia, with selectivity higher than that for glucose. The method for regenerating a liquid to be treated and the regenerating agent according to the present embodiment are therefore suitably employed for removal of lactic acid and ammonia, from a liquid to be treated that contains glucose.

Such combination of the lactic acid adsorbent and the ammonia adsorbent of this embodiment can also suppress the pH of the liquid to be treated from fluctuating possibly due to addition of the adsorbents. Hence, the liquid to be treated, if being a culture liquid, may become less likely to cause deactivation of the medium component, due to pH fluctuation. Such small pH fluctuation allows increase of the amount of consumption of the individual adsorbents, thus increasing the amount of removal of lactic acid and ammonia removed. The individual adsorbents are also less toxic typically to cell. Thus, the method for regenerating a liquid to be treated and the regenerating agent according to this embodiment are particularly suitably employable for removal of lactic acid and ammonia from culture liquid.

In a case where the liquid to be treated is a culture liquid, the amount of consumption of the culture liquid may be reduced, as compared with the known dialysis technique. This enables further cost reduction, since the culture liquid is expensive overall. The removal of lactic acid and ammonia also enables mass culture of cell and so forth at high density. Moreover, in a case where the cell is pluripotent stem cell, the removal of lactic acid and ammonia not only enables high-density mass culture of the cell, but also keeps the cell in an undifferentiated stage, or, maintains the pluripotent nature (pluripotency) of the cell. Thus, it now becomes possible to obtain a large amount of the cell suitable for producing differentiation-inducing tissue. This successfully reduces the cost for producing the cell.

The amount of consumption of each of the lactic acid adsorbent 4 and the ammonia adsorbent 5 is preferably adjusted, so that the concentration thereof relative to the liquid to be treated will be 0.025 g/mL or higher and 0.1 g/mL or lower. This makes it possible to more effectively remove lactic acid and ammonia, and more effectively suppress the glucose adsorption rate.

The embodiments of the present invention have been detailed. The aforementioned embodiments merely illustrate specific examples for carrying out the present invention. The contents of the embodiments do not limit the technical scope of the present invention, instead allowing numerous design changes such as modification, addition, and deletion of constituents, without departing from the spirit of the present invention specified in the claims. Any new embodiment with design change will have effects derived both from an embodiment and modification to be combined. While the aforementioned embodiments, all contents possibly subject to such design change have been emphasized with a notation stating " . . . of this embodiment" or "in this embodiment", also any content without such notation is acceptable for the design change. Also free combination of the aforementioned constituents is valid as a mode of the present invention.

EXAMPLES

Examples of the present invention will be explained below, merely as illustrative ones for properly explaining the present invention, without limiting the present invention.

Synthesis of Mg—Al-Based LDH

A three-necked flask was prepared, with 3575 mg/L HEPES solution (from FUJIFILM Wako Pure Chemical Corporation) contained therein. In a nitrogen atmosphere under conditions of 30° C., and pH 10.5, the HEPES solution was kept stirred at 300 rpm, to which a $Mg(NO_3)_2$—$Al(NO_3)_3$ mixed solution was added dropwise. After a lapse of one hour from the start of dropwise addition, the reaction liquid was filtered, and the product was washed with water. The obtained product was dried at 40° C. under reduced pressure for 40 hours, to obtain HEPES-type Mg—Al-based LDH (appropriately denoted as Mg—Al LDH, hereinafter) having HEPES as an intercalated ion.

Performance Analyses of Adsorbents in Aqueous Solution of Lactic Acid and Ammonia Performances of the individual adsorbents, when added to a mixed aqueous solution of lactic acid and ammonia, were evaluated in three types of adsorption process. The adsorption process includes a simultaneous treatment system in which lactic acid adsorption treatment and ammonia adsorption treatment simultaneously proceed; a two-step treatment system in which the lactic acid adsorption treatment is followed by the ammonia adsorption treatment; and a two-step treatment system in which the ammonia adsorption treatment is followed by the lactic acid adsorption treatment.

Simultaneous Treatment System

First, sodium lactate (from FUJIFILM Wako Pure Chemical Corporation) and ammonium chloride (from FUJIFILM Wako Pure Chemical Corporation) were added to pure water, to prepare an aqueous solution with the concentrations of both of sodium lactate and ammonium chloride adjusted to 10 mmol/L. Twenty milliliters of this aqueous solution was placed in a 50 mL Erlenmeyer flask. Into the Erlenmeyer flask that contains the aqueous solution, 0.5 g of Mg—Al LDH as the lactic acid adsorbent, and 0.5 g of 500KOA (from Tosoh Corporation) as the ammonia adsorbent were placed.

The Erlenmeyer flask was immersed in a thermostatic shaking bath, and shaken at 37° C., 150 rpm for 24 hours (implementation of lactic acid adsorption treatment and ammonia adsorption treatment). The aqueous solution was then suction filtered to remove the adsorbents. Lactic acid concentration and ammonia concentration of the thus obtained filtrate was measured with use of an HPLC analyzer (from JASCO Corporation). Also adsorption rates of lactic acid and ammonia were estimated from the equation below. Results are summarized in FIG. 2.

Adsorption rate (%)={[Concentration before adsorption−Concentration after adsorption]/Concentration before adsorption}×100

Two-Step Treatment System: Lactic Acid→Ammonia

Into the Erlenmeyer flask with 20 mL of the same aqueous solution as used to test the simultaneous treatment system contained therein, 0.5 g of Mg—Al LDH as the lactic acid adsorbent was placed, and the mixture was then allowed to adsorb lactic acid following the same procedure as used to test the simultaneous treatment system. The aqueous solution was then suction filtered to remove the lactic acid adsorbent. To the thus obtained filtrate, 0.5 g of 500KOA was added as the ammonia adsorbent, and the mixture was then subjected to the ammonia adsorption treatment, following the same procedure as used to test the simultaneous treatment system. The aqueous solution was then suction filtered to remove the ammonia adsorbent. The lactic acid concentration and the ammonia concentration of the obtained filtrate were measured, and the absorption rate of lactic acid and adsorption rate of ammonia were estimated in the same way as in the test for the simultaneous treatment system. Results are summarized in FIG. 2.

Two-Step Treatment System: Ammonia→Lactic Acid

Into the Erlenmeyer flask with 20 mL of the same aqueous solution as used to test the simultaneous treatment system contained therein, 0.5 g of 500KOA was placed as the ammonia adsorbent, and the mixture was allowed to adsorb ammonia following the same procedure as used to test the simultaneous treatment system. The aqueous solution was then suction filtered to remove the ammonia adsorbent. To the thus obtained filtrate, 0.5 g of Mg—Al LDH was added as the lactic acid adsorbent, and the mixture was then subjected to the lactic acid adsorption treatment, following the same procedure as used to test the simultaneous treatment system. The aqueous solution was then suction filtered to remove the lactic acid adsorbent. The lactic acid concentration and the ammonia concentration of the obtained filtrate were measured, and the absorption rate of lactic acid and adsorption rate of ammonia were estimated in the same way as in the test for the simultaneous treatment system. Results are summarized in FIG. 2.

FIG. 2 is a chart summarizing adsorption rate of lactic acid, and adsorption rate of ammonia, in the aqueous solution of lactic acid and ammonia. As summarized in FIG. 2, a high adsorption rate of lactic acid of 50% or higher, and a high adsorption rate of ammonia of 60% or higher were obtained in all adsorption processes. The combination of Mg—Al-based LDH and L-type zeolite was thus confirmed to effectively remove lactic acid and ammonia from the aqueous solution, irrespective of the sequential order of adsorption.

Performance Analyses of Adsorbents in Culture Liquid

Performances of the individual adsorbents, when added to the culture liquid as a glucose-containing solution, were evaluated in three types of adsorption process. The three types of adsorption process are similar to those in the analysis with use of the aqueous solution.

Simultaneous Treatment System

First, sodium lactate (from FUJIFILM Wako Pure Chemical Corporation) and ammonium chloride (from FUJIFILM Wako Pure Chemical Corporation) were added to an iPS cell culture medium (StemFit: from Ajinomoto Co., Inc.), to prepare a culture liquid with the concentrations of both of sodium lactate and ammonium chloride adjusted to 10 mmol/L. The culture liquid has a glucose concentration of 250 mg/dL. The culture liquid was found, by measurement, to have a pH of 7.4. Twenty milliliters each of this culture solution was dispensed into a plurality of 50 mL tubes.

Mg—Al LDH as the lactic acid adsorbent, and 500KOA (from Tosoh Corporation) as the ammonia adsorbent were added in each of the 50 mL tubes. The amount of addition (concentration) of each adsorbent was varied among 0.02 g (0.001 g/mL), 0.1 g (0.005 g/mL), 0.5 g (0.025 g/mL), 1.0 g (0.05 g/mL) and 2.0 g (0.1 g/mL). The individual 50 mL tubes were immersed in a thermostatic shaking bath, and shaken at 37° C., 60 times/min for 24 hours (implementation of lactic acid adsorption treatment and ammonia adsorption treatment). The aqueous solution was then suction filtered to remove the adsorbents. The thus obtained filtrate was measured with a blood gas analyzer (ABL800 FLEX: from Radiometer Medical ApS), to determine the lactic acid concentration, the glucose concentration, and pH. The thus obtained filtrate was also measured with an Ammonia Assay Kit (from Sigma-Aldrich Co. LLC.), to determine the ammonia concentration. Also adsorption rates of lactic acid, glucose, and ammonia were estimated from the aforementioned equation. Results are summarized in FIG. 3.

Two-Step Treatment System: Lactic Acid→Ammonia

Into a plurality of 50 mL tubes with 20 mL each of the same culture liquid as used to test the simultaneous treatment system contained therein, Mg—Al LDH as the lactic acid adsorbent was placed, and the mixture was then allowed to adsorb lactic acid. The amount of addition (concentration) of the adsorbent, and the procedure of the adsorption treatment are same as those in the test of the simultaneous treatment system. The aqueous solution was then suction filtered to remove the lactic acid adsorbent. To the thus obtained filtrate, 500KOA was added as the ammonia adsorbent, and the mixture was then subjected to the ammonia adsorption treatment. The amount of addition (concentration) of the adsorbent, and the procedure of the adsorption treatment are same as those in the test of the simultaneous treatment system. The aqueous solution was then suction filtered to remove the ammonia adsorbent. Measurement of the lactic acid concentration, the glucose concentration, pH and the ammonia concentration of the thus obtained filtrate; and estimation of the adsorption rate of lactic acid, the adsorption rate of glucose, and the adsorption rate of ammonia were conducted in the same way as in the test for the simultaneous treatment system. Results are summarized in FIG. 3.

Two-Step Treatment System: Ammonia→Lactic Acid

Into a plurality of 50 mL tubes with 20 mL each of the same aqueous solution as used to test the simultaneous treatment system contained therein, 500KOA was added as the ammonia adsorbent, and the mixture was then subjected to the ammonia adsorption treatment. The amount of addition (concentration) of the adsorbent, and the procedure of the adsorption treatment are same as those in the test of the simultaneous treatment system. The aqueous solution was then suction filtered to remove the ammonia adsorbent. To the thus obtained filtrate, Mg—Al LDH was added as the lactic acid adsorbent, and the mixture was then subjected to the lactic acid adsorption treatment. The amount of addition (concentration) of the adsorbent, and the procedure of the adsorption treatment are same as those in the test of the simultaneous treatment system. The aqueous solution was then suction filtered to remove the lactic acid adsorbent. Measurement of the lactic acid concentration, the glucose concentration, pH and the ammonia concentration of the thus obtained filtrate; and estimation of the adsorption rate of lactic acid, the adsorption rate of glucose, and the adsorption rate of ammonia were conducted in the same way as in the test for the simultaneous treatment system. Results are summarized in FIG. 3.

FIG. 3 is a chart summarizing adsorption rate of lactic acid, adsorption rate of ammonia, adsorption rate of glucose, and pH, in a cell culture liquid. As summarized in FIG. 3, all adsorption processes were confirmed to remove lactic acid and ammonia, with selectivity higher than that for glucose. In particular, the lactic acid adsorbent and the ammonia adsorbent were confirmed to demonstrate a high adsorption rate of lactic acid such as approximately 30% or higher, and a high adsorption rate of ammonia such as approximately 50% or higher, respectively, when the concentration was adjusted to 0.025 g/mL or higher for both of them. The lactic acid adsorbent and the ammonia adsorbent were also confirmed to suppress the adsorption rate of glucose to 20% or lower, when the concentration was adjusted to 0.1 g/mL or lower for both of them. It was also confirmed that the range of fluctuation of pH could be suppressed to approximately 1 or smaller, by adjusting the concentration of both adsorbents to 0.1 g/mL or lower.

Selection of Useful Combinations of Lactic Acid Adsorbent and Ammonia Adsorbent

Various types of the lactic acid adsorbent and the ammonia adsorbent were combined and added to the culture liquid, and adsorptivity was evaluated for each combination, in three types of adsorption process. The three types of adsorption process are as described above.

Candidate materials for the lactic acid adsorbent prepared herein were as follows.

Layered double hydroxide (Ca—Al LDH)
Layered double hydroxide (Cu—Al LDH)
Layered double hydroxide (Mg—Al LDH)
Layered double oxide (Mg—Al LDO)
Weakly basic anion exchange resin (WA30: from Mitsubishi Chemical Corporation)

Meanwhile, candidate materials for the ammonia adsorbent prepared herein were as follows.

Strongly acidic cation exchange resin (PK216LH: from Mitsubishi Chemical Corporation)
L-type zeolite (500KOA: from Tosoh Corporation)
Metal complex (Prussian blue: from Kanto Chemical Co., Inc.)

Simultaneous Treatment System

The candidate materials for the individual adsorbents were combined in a round-robin manner. Into a plurality of 50 mL tubes with 20 mL each of the culture liquid contained therein, 0.5 g each of the adsorbents in each combination was added. The individual 50 mL tubes were immersed in a thermostatic shaking bath, and shaken at 37° C., 150 rpm for 24 hours (implementation of lactic acid adsorption treatment and ammonia adsorption treatment). The aqueous solution was then suction filtered to remove the adsorbents. The thus obtained filtrate was measured with a blood gas analyzer (ABL800 FLEX: from Radiometer Medical ApS), to determine the lactic acid concentration. The thus obtained filtrate was also measured with an Ammonia Assay Kit (from Sigma-Aldrich Co. LLC.), to determine the ammonia concentration. Also adsorption rates of lactic acid and ammonia were estimated from the equation above.

Cases with both the lactic acid adsorption rate and the ammonia adsorption rate found to be 25% or higher were ranked A. Cases with only the lactic acid adsorption ratio found to be 25% or higher were ranked Bl. Cases with only the ammonia adsorption ratio found to be 25% or higher were ranked Ba. Cases with both the lactic acid adsorption rate and the ammonia adsorption rate found to be lower than 25% were ranked X. Results are summarized in FIG. 4A.

Two-Step Treatment System: Lactic Acid→Ammonia

Into a plurality of 50 mL tubes with 20 mL each of the same aqueous solution as used to test the simultaneous treatment system contained therein, the lactic acid adsorbent in each of the individual combinations was added, and the mixture was then subjected to the lactic acid adsorption treatment, following the same procedures as used to test the simultaneous treatment system. The aqueous solution was then suction filtered to remove the lactic acid adsorbent. To the thus obtained filtrate, the ammonia adsorbent with each of the individual combinations was added, and the mixture was then subjected to the ammonia adsorption treatment, following the same procedure as used to test the simultaneous treatment system. The aqueous solution was then suction filtered to remove the ammonia adsorbent. Measurement of the lactic acid concentration and the ammonia concentration of the thus obtained filtrate; estimation of the absorption rate of lactic acid and the adsorption rate of ammonia; and evaluation of the adsorptivity were conducted in the same way as in the test for the simultaneous treatment system. Results are summarized in FIG. 4B.

Two-Step Treatment System: Ammonia→Lactic Acid

Into a plurality of 50 mL tubes with 20 mL each of the same aqueous solution as used to test the simultaneous treatment system contained therein, the ammonia adsorbent with each of the individual combinations was added, and the mixture was then subjected to the ammonia adsorption treatment, following the same procedures as used to test the simultaneous treatment system. The aqueous solution was then suction filtered to remove the ammonia adsorbent. To the thus obtained filtrate, the lactic acid adsorbent with each of the individual combinations was added, and the mixture was then subjected to the lactic acid adsorption treatment, following the same procedure as used to test the simultaneous treatment system. The aqueous solution was then suction filtered to remove the lactic acid adsorbent. Measurement of the lactic acid concentration and the ammonia concentration of the thus obtained filtrate; estimation of the absorption rate of lactic acid and the adsorption rate of ammonia; and evaluation of the adsorptivity were conducted in the same way as in the test for the simultaneous treatment system. Results are summarized in FIG. 4C.

FIG. 4A is a chart summarizing adsorptivity in a simultaneous treatment system under various combinations of adsorbents. FIG. 4B is a chart summarizing adsorptivity in a two-step treatment system in which lactic acid adsorption treatment is followed by ammonia adsorption treatment, under various combinations of adsorbents. FIG. 4C is a chart summarizing adsorptivity in a two-step treatment system in which ammonia adsorption treatment is followed by lactic acid adsorption treatment, under various combinations of adsorbents. As summarized in FIGS. 4A to 4C, only a combination of Mg—Al LDH and L-type zeolite was found to demonstrate high adsorption rate of lactic acid and high adsorption rate ammonia, irrespective of the adsorption process. From this, the combination of the lactic acid adsorbent that contains Mg—Al-based LDH and the ammonia adsorbent that contains L-type zeolite was confirmed to demonstrate excellent lactic acid adsorptivity and ammonia adsorptivity, as compared with the other combinations of the adsorbents. Excellent usefulness of the combination of the lactic acid adsorbent that contains Mg—Al-based LDH and the ammonia adsorbent that contains L-type zeolite may be understood, also from the viewpoint of toxicity to cells and pH fluctuation.

What is claimed is:

1. A method for regenerating a liquid to be treated, the method comprising: bringing a lactic acid adsorbent that contains a Mg—Al-based layered double hydroxide having $Mg^{2+}$ and $Al^{3+}$ as constituent metals, and an ammonia adsorbent having L-type zeolite, into contact with the liquid to be treated that contains lactic acid and ammonia, to remove lactic acid and ammonia in the liquid to be treated,
    wherein the liquid to be treated is a culture liquid of at least either cell or microorganism that contains glucose, and
    wherein an amount of consumption of each of the lactic acid adsorbent and the ammonia adsorbent is adjusted so that a concentration thereof relative to the liquid to be treated is 0.05 g/mL or higher and 0.1 g/mL or lower for both the lactic acid adsorbent and the ammonia adsorbent.

2. A regenerating agent for a liquid to be treated, the regenerating agent comprising:

a lactic acid adsorbent that contains a Mg—Al-based layered double hydroxide having $Mg^{2+}$ and $Al^{3+}$ as constituent metals; and
an ammonia adsorbent having L-type zeolite,
wherein the regenerating agent is configured to remove lactic acid and ammonia in the liquid to be treated, upon being bought into contact with the liquid to be treated that contains lactic acid and ammonia,
wherein the liquid to be treated is a culture liquid of at least either cell or microorganism that contains glucose, and
wherein an amount of consumption of each of the lactic acid adsorbent and the ammonia adsorbent is adjusted so that a concentration thereof relative to the liquid to be treated is 0.05 g/mL or higher and 0.1 g/mL or lower for both the lactic acid adsorbent and the ammonia adsorbent.

* * * * *